(12) United States Patent
Suki (10) Patent No.: US 12,033,255 B2
(45) Date of Patent: Jul. 9, 2024

(54) IMAGE PROCESSING APPARATUS AND IMAGE PROCESSING METHOD

(71) Applicant: Sony Interactive Entertainment Inc., Tokyo (JP)

(72) Inventor: Yasuyuki Suki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 133 days.

(21) Appl. No.: 17/792,273

(22) PCT Filed: Jan. 30, 2020

(86) PCT No.: PCT/JP2020/003458
§ 371 (c)(1),
(2) Date: Jul. 12, 2022

(87) PCT Pub. No.: WO2021/152777
PCT Pub. Date: Aug. 5, 2021

(65) Prior Publication Data
US 2023/0114438 A1    Apr. 13, 2023

(51) Int. Cl.
*G06T 11/60* (2006.01)
*G06T 5/70* (2024.01)
*G06V 10/25* (2022.01)
*G06V 10/60* (2022.01)

(52) U.S. Cl.
CPC .............. *G06T 11/60* (2013.01); *G06T 5/70* (2024.01); *G06V 10/25* (2022.01); *G06V 10/60* (2022.01)

(58) Field of Classification Search
CPC .......... G06T 11/60; G06T 5/002; G06V 10/25; G06V 10/60
See application file for complete search history.

(56) References Cited

U.S. PATENT DOCUMENTS

| | | | |
|---|---|---|---|
| 7,050,066 | B2 | 5/2006 | Ohta |
| 7,526,139 | B2 | 4/2009 | Yamakado |
| 8,613,012 | B2 | 12/2013 | Ikegami |
| 2003/0090494 | A1 | 5/2003 | Ohta |
| 2007/0065012 | A1 | 3/2007 | Yamakado |
| 2008/0256573 | A1 | 10/2008 | Ikegami |

(Continued)

FOREIGN PATENT DOCUMENTS

| | | |
|---|---|---|
| JP | 2003150146 A | 5/2003 |
| JP | 2006333045 A | 12/2006 |

(Continued)

OTHER PUBLICATIONS

Notice of Reasons for Refusal for corresponding JP Application No. 2021-574367, 10 pages, dated May 10, 2023.

(Continued)

*Primary Examiner* — Grace Q Li (74) *Attorney, Agent, or Firm* — Matthew B. Dernier, Esq.

(57) ABSTRACT

A first image processing section performs a blurring process on a target region that is at least a part of a content image. A second image processing section performs predetermined image processing on the blurring-processed target region by using brightness values of individual pixels in the target region that has not yet been blurring-processed. A text processing section displays text over the target region that is subjected to the predetermined image processing.

7 Claims, 10 Drawing Sheets

(56) References Cited

U.S. PATENT DOCUMENTS

| | | | |
|---|---|---|---|
| 2010/0177118 A1* | 7/2010 | Sytnikov | G06T 11/60 |
| | | | 345/619 |
| 2017/0277297 A1 | 9/2017 | Ishibashi | |
| 2020/0037010 A1* | 1/2020 | Anders | H04N 21/2187 |
| 2020/0195913 A1* | 6/2020 | Wuolijoki | H04N 23/951 |

FOREIGN PATENT DOCUMENTS

| | | |
|---|---|---|
| JP | 2007082145 A | 3/2007 |
| JP | 2008259206 A | 10/2008 |
| JP | 2017173990 A | 9/2017 |
| JP | 2018190432 A | 11/2018 |

OTHER PUBLICATIONS

International Search Report for corresponding PCT Application No. PCT/JP2020/003458, 4 pages, dated Apr. 7, 2020.

* cited by examiner

BLURRED IMAGE

(b)

BLURRED IMAGE

TARGET REGION BEFORE BLURRING PROCESS (b)

BRIGHTNESS VALUE REFLECTION PROCESS AFTER BLURRING PROCESS

FIG. 10

IMAGE PROCESSING APPARATUS AND IMAGE PROCESSING METHOD

TECHNICAL FIELD

The present invention relates to a technology for displaying text over an image.

BACKGROUND ART

Text indicating, for example, menu items may be displayed over a content image such as a game, in some cases. It is known that the visibility of text is low in a case where the text is displayed over a complex content image or over a content image exhibiting significant spatial and/or temporal color changes. Consequently, there is an existing method for increasing the visibility of text by performing a blurring process of blurring a content image and displaying the text over a blurred region.

SUMMARY

Technical Problem

The blurring process is a process of replacing colors of pixels forming an original image with colors averaged by the colors of a plurality of pixels around the pixels forming the original image. A strength of blur depends on the number of pixels to be used for averaging. An increase in the number of pixels for averaging increases the strength of blur of the resulting image. The visibility of text can be improved by increasing the strength of blur of a region over which the text is displayed.

Meanwhile, contours of various objects contained in the original image disappear in strongly blurred images. This impairs unity and continuity with the original image. Therefore, demanded is an image processing technology that increases the visibility of text displayed over an image while maintaining unity and continuity with the original image.

Solution to Problem

In order to solve the above problem, according to an aspect of the present invention, there is provided an image processing apparatus including a first image processing section that performs a blurring process on a target region that is at least a part of a content image, a second image processing section that performs predetermined image processing on the blurring-processed target region by using brightness values of individual pixels in the target region that has not yet been blurring-processed, and a text processing section that displays text over the target region subjected to the predetermined image processing.

According to another aspect of the present invention, there is provided an image processing method including a step of performing a blurring process on a target region that is at least a part of a content image, a step of performing predetermined image processing on the blurring-processed target region by using brightness values of individual pixels in the target region that has not yet been blurring-processed, and a step of displaying text over the target region subjected to the predetermined image processing.

Any combinations of the abovementioned component elements and any conversions of expressions of the present invention between, for example, methods, apparatuses, systems, recording media, and computer programs are also effective as the aspects of the present invention.

DESCRIPTION OF EMBODIMENT

Figure 1:
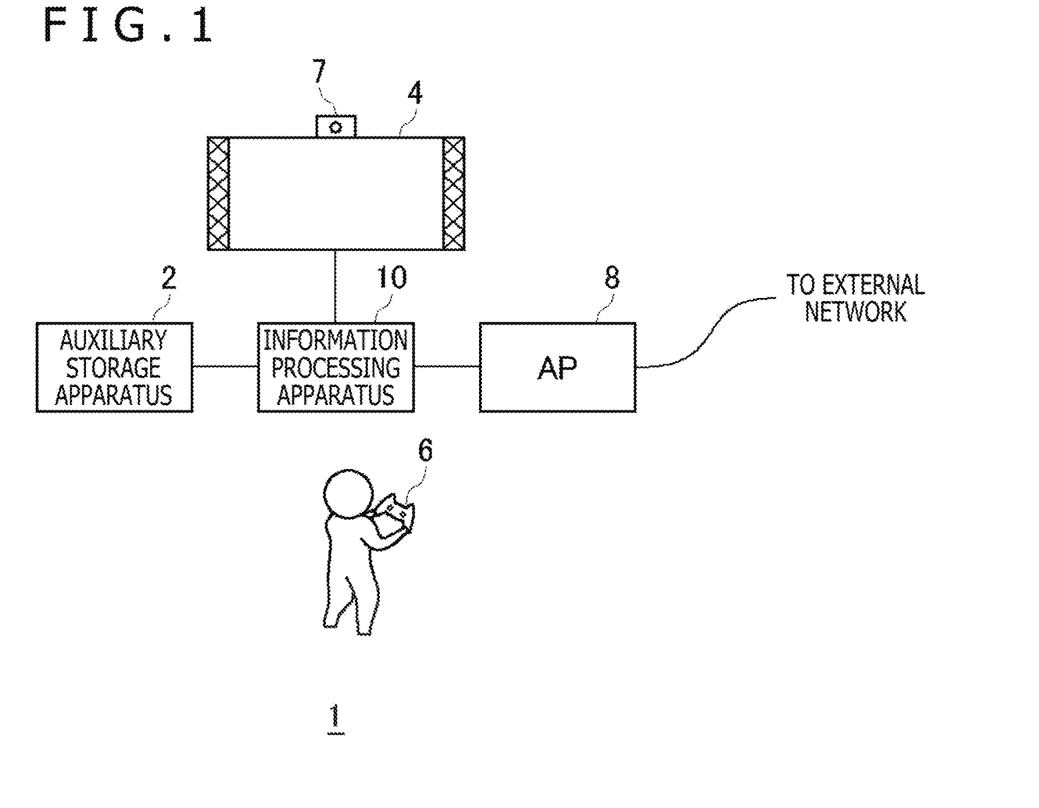
FIG. 1 is a diagram illustrating an information processing system according to an embodiment of the present invention.

FIG. 1 illustrates an information processing system 1 according to an embodiment of the present invention. The information processing system 1 includes an auxiliary storage apparatus 2, an output apparatus 4, an input apparatus 6, a camera 7, and an information processing apparatus 10. The information processing apparatus 10 may be connected to an external network through an access point (AP) 8. The information processing apparatus 10 according to the embodiment operates as an image processing apparatus for displaying text over an image.

The input apparatus 6 is wirelessly or wiredly connected to the information processing apparatus 10. Upon receiving operation input from a user, the input apparatus 6 supplies operation information to the information processing apparatus 10. The information processing apparatus 10 receives the operation information from the input apparatus 6, reflects the received operation information in the processing of system software and application software, and causes the output apparatus 4 to output a processing result.

The information processing apparatus 10 according to the embodiment may be a game apparatus for executing game software. The input apparatus 6 may be a game controller or other equipment for supplying user's operation information to the information processing apparatus 10. It should be noted that the information processing apparatus 10 may have a function for executing application software other than the game software and have a function for reproducing content such as a movie. The input apparatus 6 includes a plurality of input sections such as a plurality of push-type operation buttons, an analog stick capable of inputting an analog quantity, and a rotary button.

The auxiliary storage apparatus 2 is a storage such as a hard disk drive (HDD) or a solid-state drive (SDS). The auxiliary storage apparatus 2 may be a built-in storage apparatus or may be an external storage apparatus that is to be connected to the information processing apparatus 10, for example, through a universal serial bus (USB). The output apparatus 4 may be a television set having a display for outputting images and a speaker for outputting sounds or may be a head-mounted display. The camera 7 captures an image of a space where the user is present.

Figure 2:
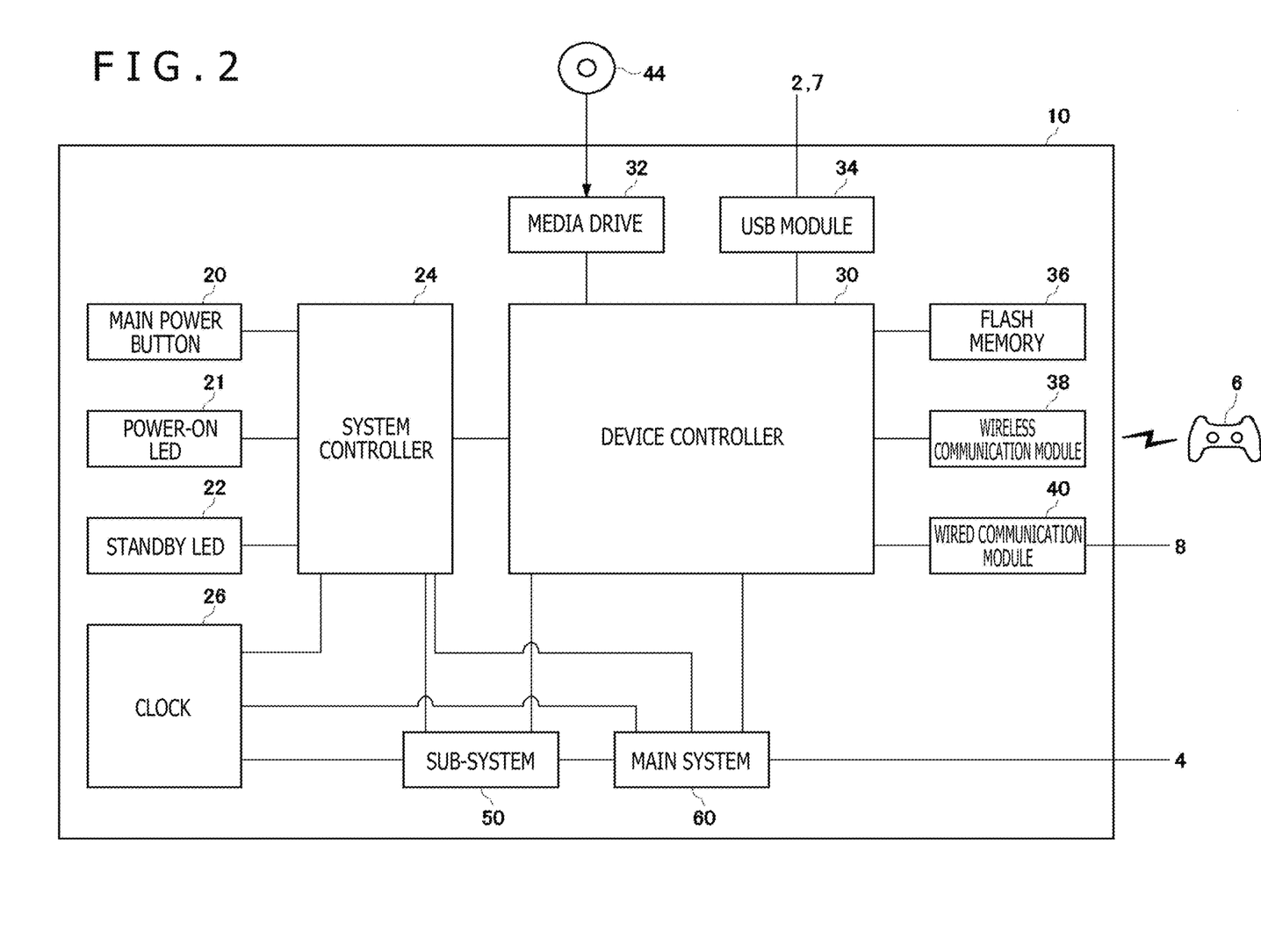
FIG. 2 is a diagram illustrating a hardware configuration of an information processing apparatus.

FIG. 2 illustrates a hardware configuration of the information processing apparatus 10. The information processing apparatus 10 includes a main power button 20, a power-ON light emitting diode (LED) 21, a standby LED 22, a system controller 24, a clock 26, a device controller 30, a media drive 32, a USB module 34, a flash memory 36, a wireless communication module 38, a wired communication module 40, a sub-system 50, and a main system 60.

The main system 60 includes, for example, a main central processing unit (CPU), a memory acting as a main storage, a memory controller, and a graphics processing unit (GPU). The GPU is mainly used for arithmetic processing of a game program. The functions of these component elements may be configured as a system on a chip and formed on a single chip. The main CPU has a function for executing a game program recorded on the auxiliary storage apparatus 2 or a read-only memory (ROM) medium 44.

The sub-system 50 includes, for example, a sub-CPU, a memory acting as a main storage, and a memory controller. However, the sub-system 50 does not include a GPU nor does it have a function for executing a game program. The sub-CPU has a smaller number of circuit gates than the main CPU, and consumes a smaller amount of power than the main CPU. The sub-CPU remains operative even while the main CPU is in standby and has limited processing capabilities in order to reduce power consumption wherever possible.

The main power button 20 is an input section where the user performs operation input. The main power button 20 is disposed on the front surface of a housing of the information processing apparatus 10, and operated to turn on or off the supply of power to the main system 60 of the information processing apparatus 10. The power-ON LED 21 illuminates when the main power button 20 is turned on. The standby LED 22 illuminates when the main power button 20 is turned off.

The system controller 24 detects that the main power button 20 is depressed by the user. When the main power button 20 is depressed while main power is off, the system controller 24 acquires such a depression operation as an "ON command." Meanwhile, when the main power button 20 is depressed while the main power is on, the system controller 24 acquires such a depression operation as an "OFF command."

The clock 26 is a real-time clock that generates current date and time information and supplies the generated current date and time information to the system controller 24, the sub-system 50, and the main system 60. The device controller 30 is configured as a large-scale integrated circuit (LSI) for transferring information between devices, like a south bridge. As depicted in FIG. 2, the device controller 30 is connected to various devices such as the system controller 24, the media drive 32, the USB module 34, the flash memory 36, the wireless communication module 38, the wired communication module 40, the sub-system 50, and the main system 60. The device controller 30 absorbs a difference in electrical characteristics and a difference in data transfer rate between the devices, and controls a timing of data transfer.

The media drive 32 is a drive apparatus which is loaded with a ROM medium 44 on which application software such as a game and license information are recorded, drives the ROM medium 44, and reads, for example, a program and data from the ROM medium 44. The ROM medium 44 may be a read-only recording medium such as an optical disc, a magneto-optical disc, or a Blu-ray Disc.

The USB module 34 is a module that is to be connected to external equipment with a USB cable. The USB module 34 may be connected to the auxiliary storage apparatus 2 and the camera 7 with USB cables. The flash memory 36 is an auxiliary storage apparatus that forms an internal storage. The wireless communication module 38 wirelessly communicates, for example, with the input apparatus 6 by use of a communication protocol such as the Bluetooth (registered trademark) protocol or Institute of Electrical and Electronics Engineers (IEEE) 802.11 protocol. The wired communication module 40 wiredly communicates with external equipment, and is connected to a network 3 through the AP 8.

Figure 3:
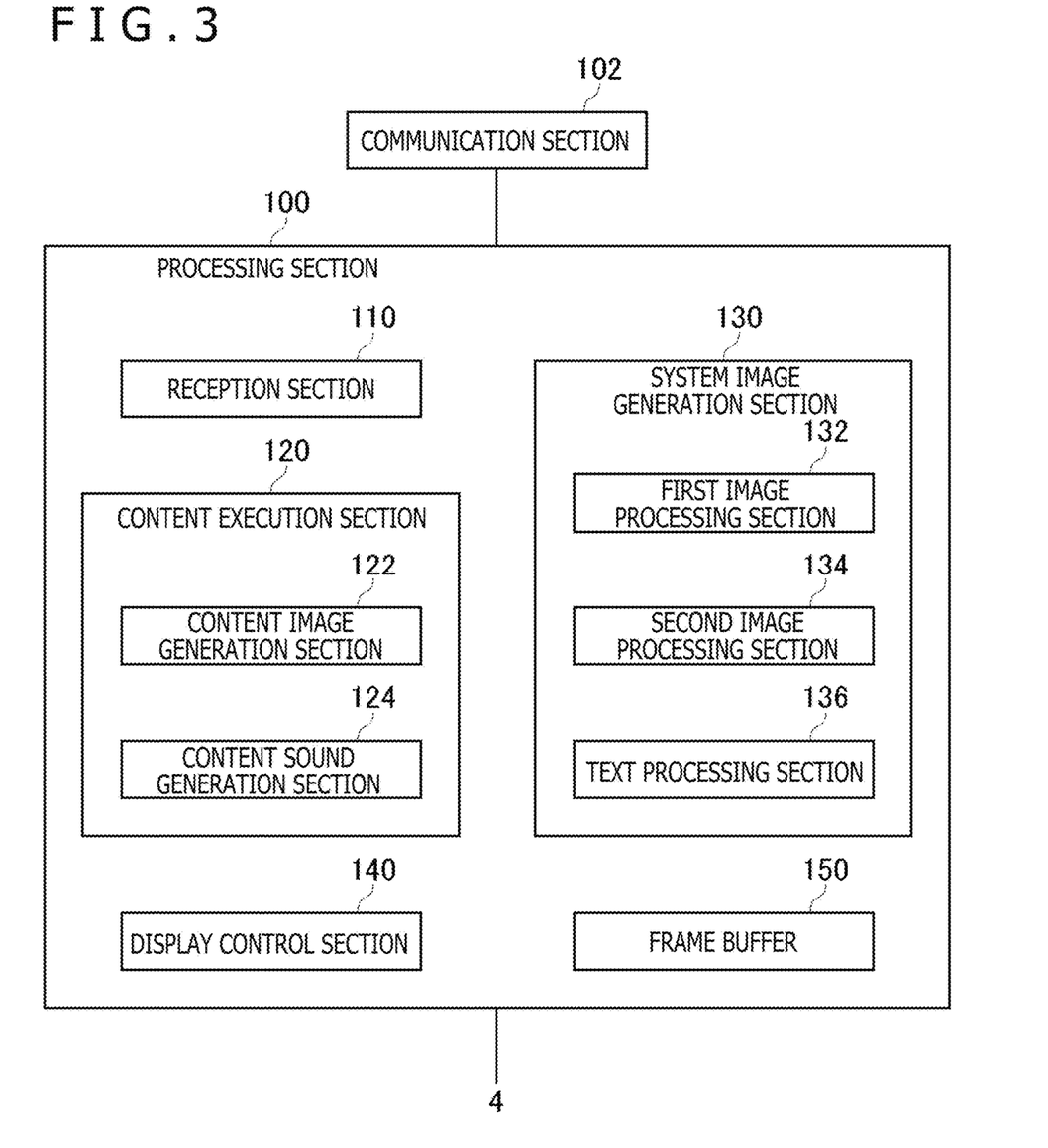
FIG. 3 is a diagram illustrating functional blocks of the information processing apparatus.

FIG. 3 illustrates functional blocks of the information processing apparatus 10. The information processing apparatus 10 includes a processing section 100 and a communication section 102. The processing section 100 includes a reception section 110, a content execution section 120, a system image generation section 130, a display control section 140, and a frame buffer 150. The display control section 140 has a function for causing the output apparatus 4 to display a content image, which is generated by the content execution section 120, and a system image, which is generated by the system image generation section 130, through the frame buffer 150.

The content execution section 120 has a function for executing content, and includes a content image generation section 122 and a content sound generation section 124. The content image generation section 122 generates a content image. The content sound generation section 124 generates a content sound. In the embodiment, the content execution section 120 executes a game program, the content image generation section 122 generates a game image, and the content sound generation section 124 generates a game sound.

The system image generation section 130 includes a first image processing section 132, a second image processing section 134, and a text processing section 136, and generates system images such as a menu image containing a plurality of menu items. The first image processing section 132 performs a blurring process on a target region that is at least a part of a content image. The second image processing section 134 performs predetermined image processing on the blurring-processed target region. The text processing section 136 displays text indicative of the menu items over the target region subjected to the predetermined image processing. The text processing section 136 may display text directly over the target region in a superimposed manner or arrange a transparent or semitransparent display board over the target region to display text on the display board.

Various component elements depicted in FIG. 3 as the functional blocks performing various processes can be formed by hardware such as a circuit block, a memory, or other LSIs, and are implemented by software such as system software or a game program loaded into a memory. Therefore, it will be understood by persons skilled in the art that the functional blocks can variously be implemented by hardware only, by software only, or by a combination of hardware and software. The method of implementing the functional blocks is not specifically limited to any kind.

The communication section 102 is configured as a component element having the functions of both the wireless communication module 38 and the wired communication module 40 depicted in FIG. 2. The communication section 102 receives the operation information that is entered by the user operating the input sections of the input apparatus 6. The reception section 110 accepts the operation information. In the embodiment, the reception section 110 accepts the operation information for displaying a menu image, and supplies the accepted operation information to the system image generation section 130.

In the content execution section 120, the content image generation section 122 generates a game moving image, and supplies the generated game moving image to the display control section 140. The display control section 140 writes game image data into the frame buffer 150, and outputs the game image data written into the frame buffer 150 to the output apparatus 4 at predetermined intervals.

Figure 4:
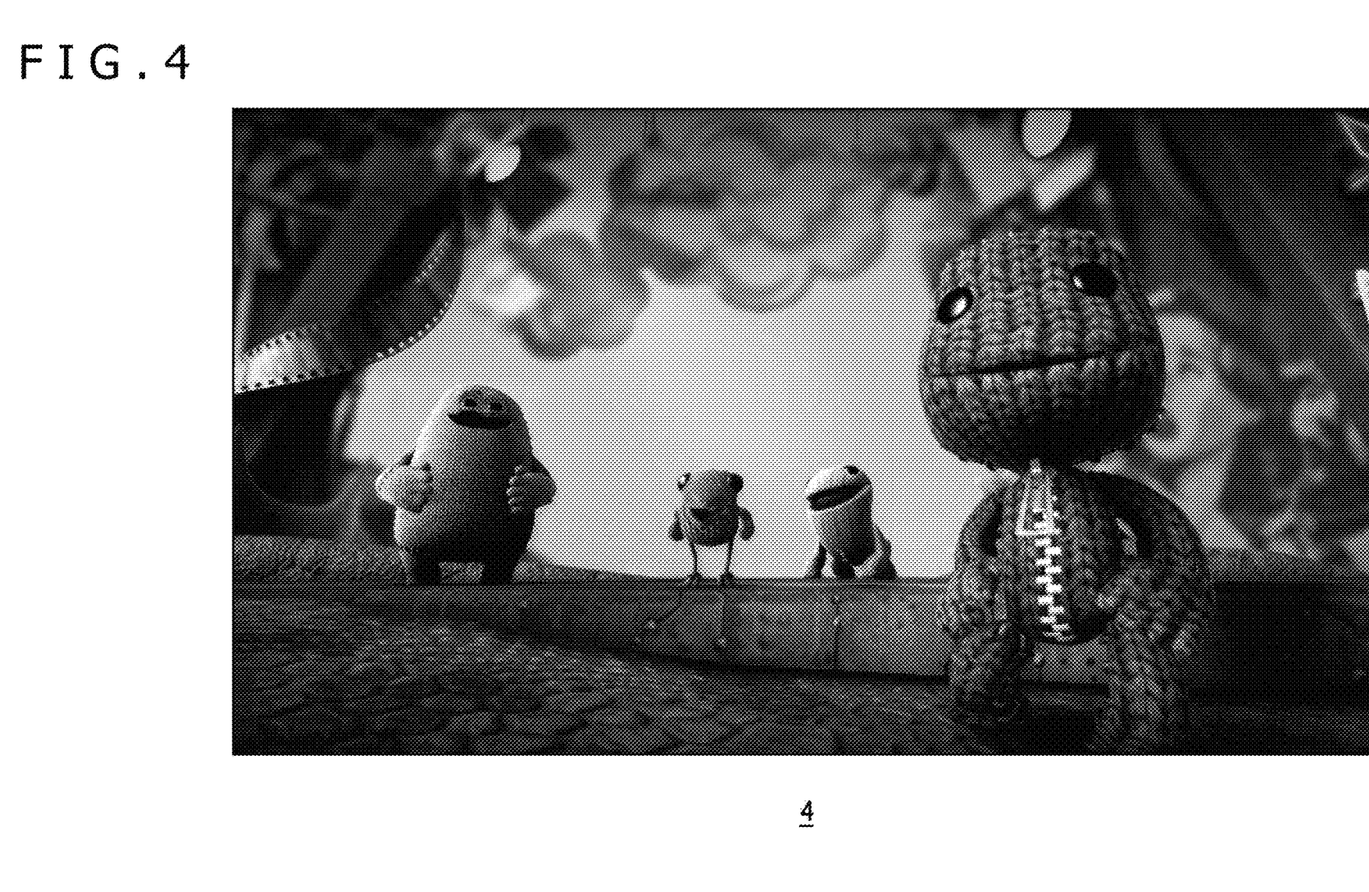
FIG. 4 is a diagram illustrating an example of a game image to be displayed.

FIG. 4 illustrates an example of a game image that is to be displayed on the output apparatus 4. The output apparatus 4 may be a stationary display apparatus such as a television set, may be a portable display apparatus such as a tablet computer, or may be a head-mounted display apparatus.

There are various elements forming the world view of content including a game. In particular, a "hue" of a video image is an important element that determines the visual atmosphere of content. When the overall hue of content is unified, the user is able to experience the world view of a game.

When the user operates a predetermined button on the input apparatus 6 during a game play, the reception section 110 accepts a request for displaying the menu items. When the reception section 110 accepts the request for displaying the menu items, the display control section 140 instructs the system image generation section 130 to generate a system image containing the menu items. In this instance, the display control section 140 may instruct the content execution section 120 to temporarily stop the progress of the game. The system image contains text indicating a plurality of menu items.

Figure 5:
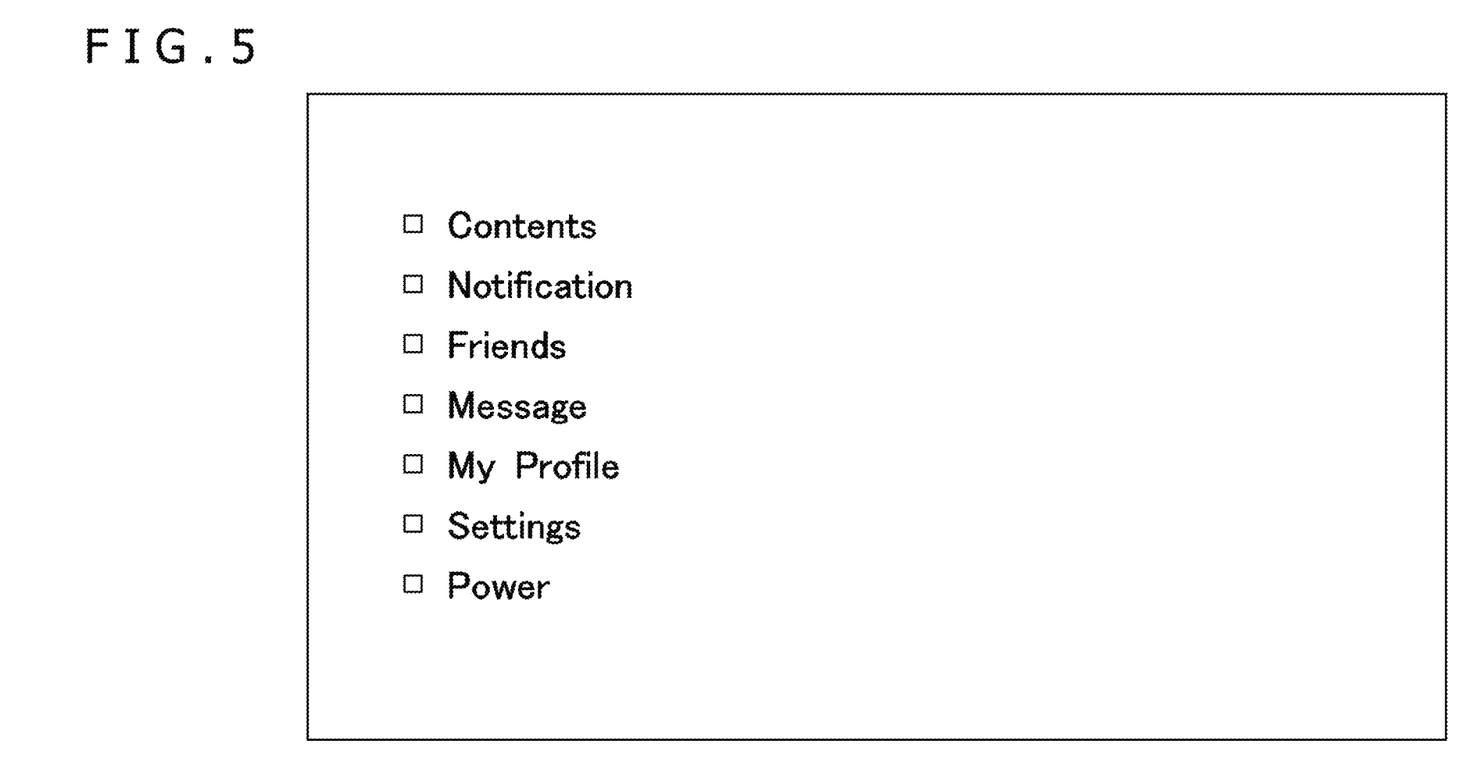
FIG. 5 is a diagram illustrating an example of a system image.

FIG. 5 illustrates an example of a system image that contains text indicating a plurality of menu items. When the system image is displayed on the output apparatus 4, the user operates the input apparatus 6 to select a desired menu item. When viewing, for example, a received message, the user places the cursor over the menu item "Message" and then operates an enter button on the input apparatus 6. This causes a message viewing screen to appear on the display.

In a case where the system image depicted in FIG. 5 is displayed as a menu screen that has a background color different from the hue representing the world view of the game, the user feels like being transferred to a world completely separated from the world of the game. Therefore, it is preferable that the background of the menu screen have the hue representing the world of the game.

Figure 6:
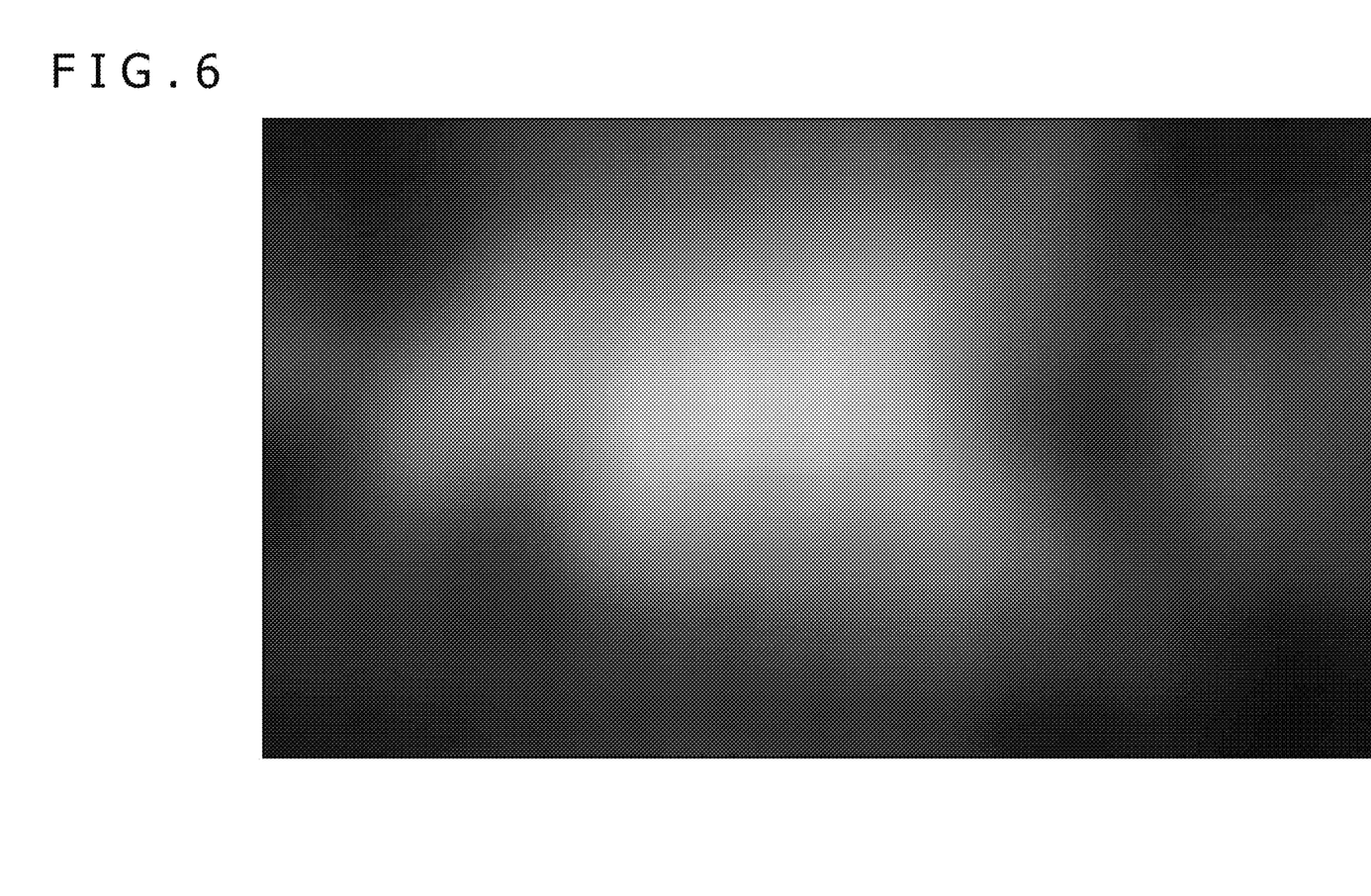
FIG. 6 is a diagram illustrating an image that is obtained by performing a blurring process on a game image.

FIG. 6 illustrates an image that is obtained by performing the blurring process on the game image depicted in FIG. 4. In the example depicted in FIG. 6, the blurring process is performed on the entire game image. Since the blurring process is performed, the contours of objects contained in the game image (see FIG. 4) disappear, so that a blurred image is obtained. However, the hue of the blurring-processed image remains similar to the hue of the world of the game.

Figure 7:
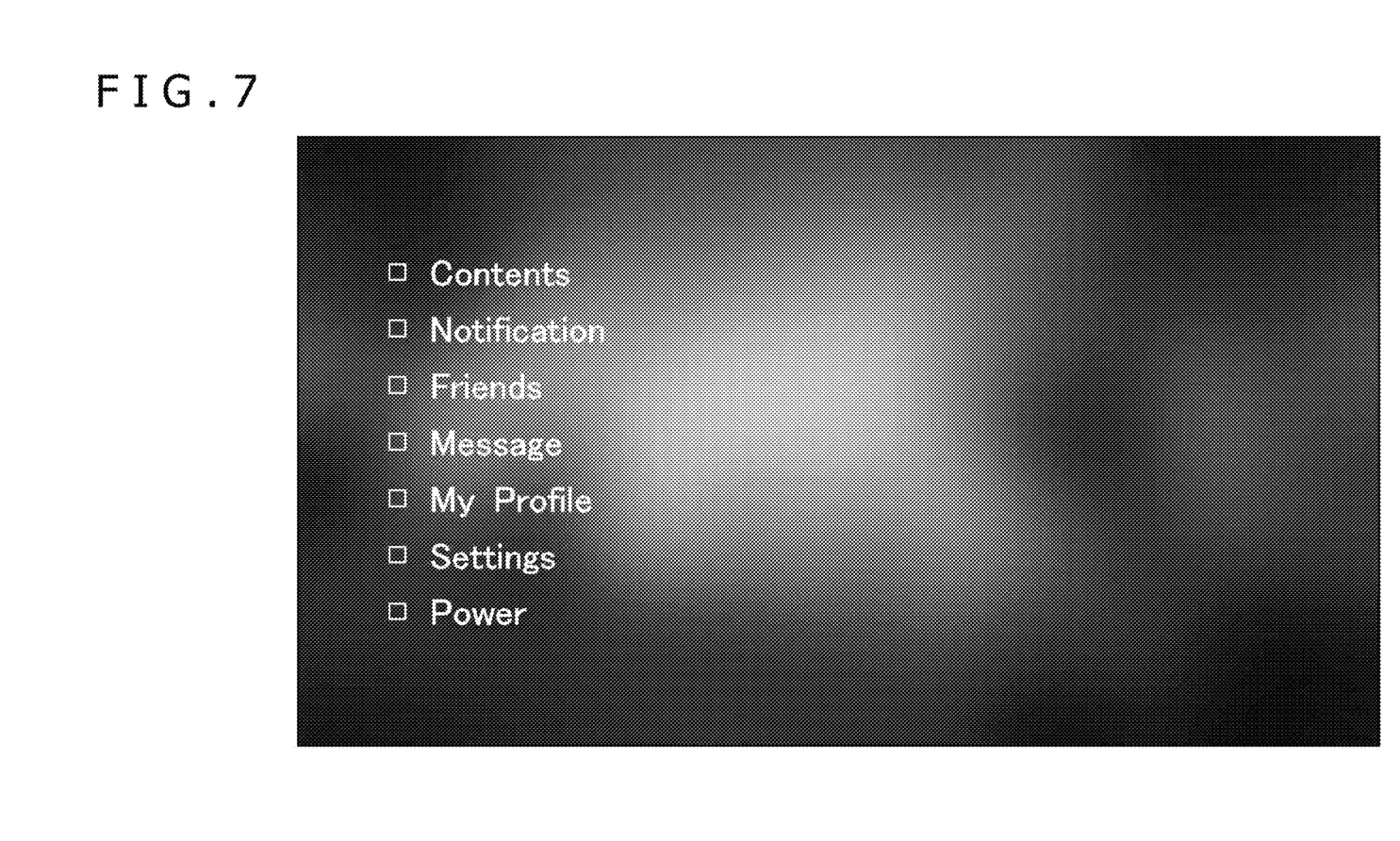
FIG. 7 is a diagram illustrating an example in which text is displayed over a blurring-processed image.

FIG. 7 illustrates an example in which text indicating the menu items is displayed over the blurring-processed image depicted in FIG. 6. Since the blurring-processed image (hereinafter referred to also as the "blurred image") is used as the background of the menu screen, the menu screen not only keeps the hue of the world of the game unchanged, but also makes the text highly visible.

Meanwhile, since the blurring process is performed on the game image, the contours of the objects disappear. This impairs unity and continuity with an original image that has not yet been blurring-processed (see FIG. 4). Therefore, in the following description, provided is a method of performing predetermined image processing on the blurred image depicted in FIG. 6 to restore unity and continuity with the original image.

When the user operates a predetermined button on the input apparatus 6 during a game play, the reception section 110 accepts a request for displaying the menu items. When the reception section 110 accepts the request for displaying the menu items, the display control section 140 instructs the system image generation section 130 to generate a system image containing the menu items. At the same time, the display control section 140 reads the brightness values (pixel values) of individual pixels in the game image retained in the frame buffer 150, and supplies the read brightness values (pixel values) to the system image generation section 130.

The first image processing section 132 performs the blurring process on a region that is at least a part of the game image. The region on which the blurring process is to be performed is hereinafter referred to as the "target region." FIG. 6 indicates that the blurring process is performed on the target region which is the entire game image and that the image generated as a result of the blurring process has lost the contours of the objects. It should be noted that the first image processing section 132 may perform the blurring process only on a limited region where the text indicating the menu items are to be disposed.

The second image processing section 134 performs predetermined image processing on the blurring-processed target region by using the brightness values of individual pixels in the target region that has not yet been blurring-processed by the first image processing section 132. More specifically, the second image processing section 134 performs image processing on the pixels in the blurring-processed target region in such a manner as to reflect the brightness values of pixels in the blurring-processed target region that are positioned at a distance based on the brightness values of the pixels that have not yet been blurring-processed.

The image processing performed on the pixels in the target region to reflect the brightness values of pixels positioned at a distance based on the brightness values of the pixels that have not yet been blurring-processed will now be described. In a situation where a pixel in the target region is referred to as the "first pixel" while a pixel positioned apart in a predetermined direction from the first pixel by a distance based on the brightness value of the first pixel that has not yet been blurring-processed is referred to as the "second pixel," the second image processing section 134 sets the brightness value of the blurring-processed second pixel for the first pixel. In other words, the second image processing section 134 replaces the brightness value of the first pixel with the brightness value of the second pixel. The distance to be set by the second image processing section 134 may increase with an increase in the brightness value of the pixel that has not yet been blurring-processed, and may decrease with a decrease in the brightness value of the pixel that has not yet been blurring-processed.

Figure 8:
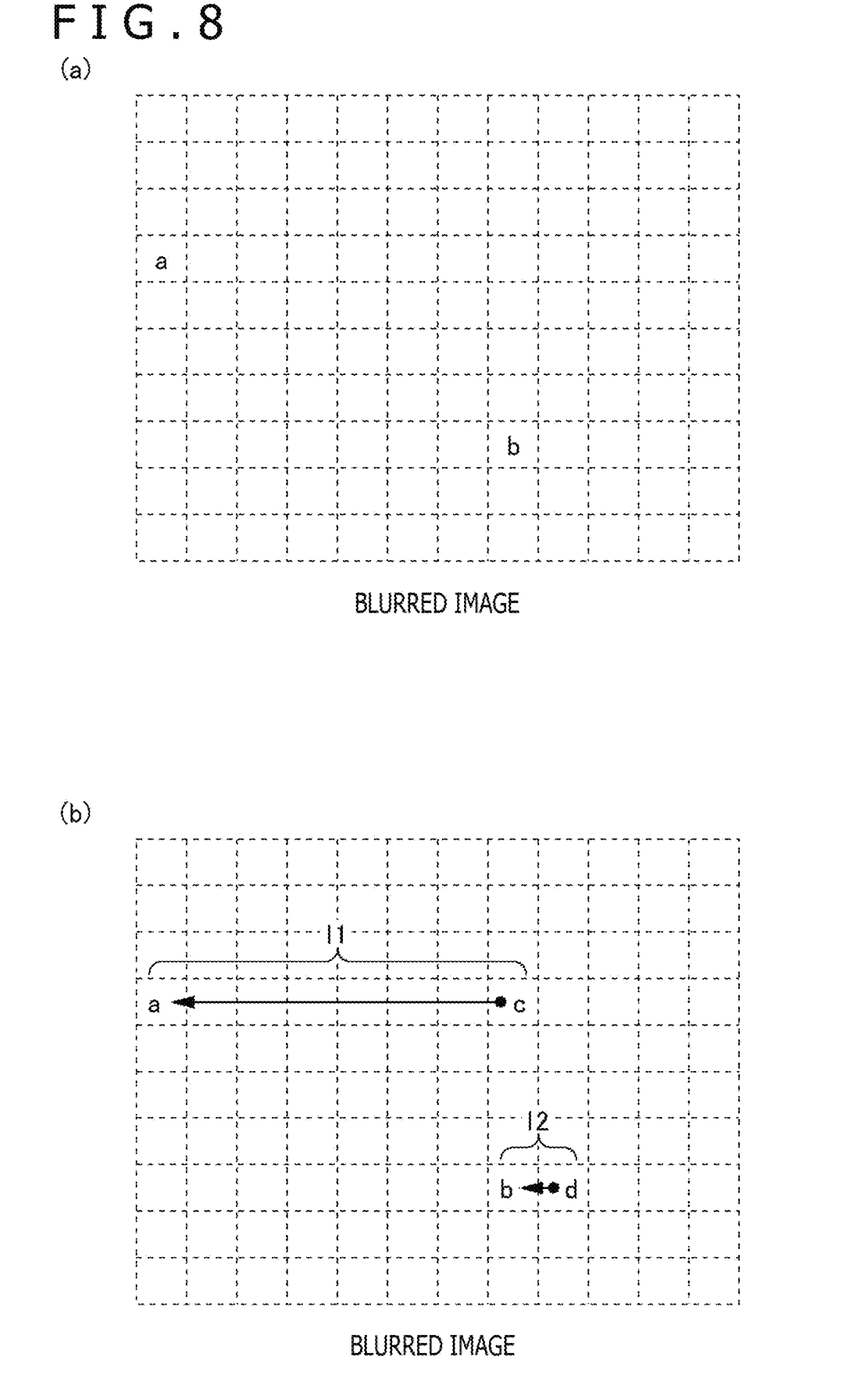
FIG. 8 depict diagrams illustrating image processing performed by a second image processing section.

FIG. 8(*a*) depicts a plurality of pixels in a blurred image. In FIG. 8(*a*), the first pixel "a" is a pixel having a relatively high brightness value before the blurring process, and the first pixel "b" is a pixel having a relatively low brightness value before the blurring process. It should be noted that the brightness value of each pixel in the blurred image is obtained by averaging the brightness values of a plurality of pixels around each pixel in the original image. Therefore, the brightness value of the first pixel "a" in the blurred image is not always high, and the brightness value of the first pixel "b" in the blurred image is not always low.

FIG. 8(b) is a diagram illustrating image processing that is performed by the second image processing section 134. In the image processing, the brightness value of the second pixel "c," which is positioned apart in a rightward direction from the first pixel "a" by a distance 11, is set for the first pixel "a" in the blurred image, and the brightness value of the second pixel "d," which is positioned apart in a rightward direction from the first pixel "b" by a distance 12, is set for the first pixel "b" in the blurred image. In other words, when the image processing is performed, the brightness value of the first pixel "a" is replaced with the brightness value of the second pixel "c," and the brightness value of the first pixel "b" is replaced with the brightness value of the second pixel "d." The distance to be set by the second image processing section 134 increases with an increase in the brightness value of the first pixel that has not yet been blurring-processed, and decreases with a decrease in the brightness value of the first pixel that has not yet been blurring-processed. Here, the first pixel "a" has a high brightness value before the blurring process, and the first pixel "b" has a low brightness value before the blurring process. Consequently, such a relation distance 11>distance 12 is satisfied.

As described above, the second image processing section 134 may reflect, in each blurring-processed pixel in the target region, the brightness value of a pixel positioned apart in a predetermined direction by a distance based on the brightness value of each pixel not yet blurring-processed. In the above example, the second image processing section 134 performs a reflection process by replacing the brightness value of each pixel with the brightness value of another pixel. However, the second image processing section 134 may alternatively perform the reflection process by using a method, for example, of adding or averaging both pixel values.

The direction of linkage between the first pixel and the second pixel, which has the brightness value to be reflected in the first pixel, may be horizontal. In the example of FIG. 8(b), the direction of linkage from the first pixel to the second pixel is determined to be rightward. The direction of linkage from the first pixel to the second pixel, which is to be determined by the second image processing section 134, may be vertical or diagonal at all times. Further, the distance relation between the first pixel and the second pixel may be reversed. More specifically, the distance to be set by the second image processing section 134 may decrease with an increase in the brightness value used before the blurring process, and may increase with a decrease in the brightness value used before the blurring process.

Figure 9:
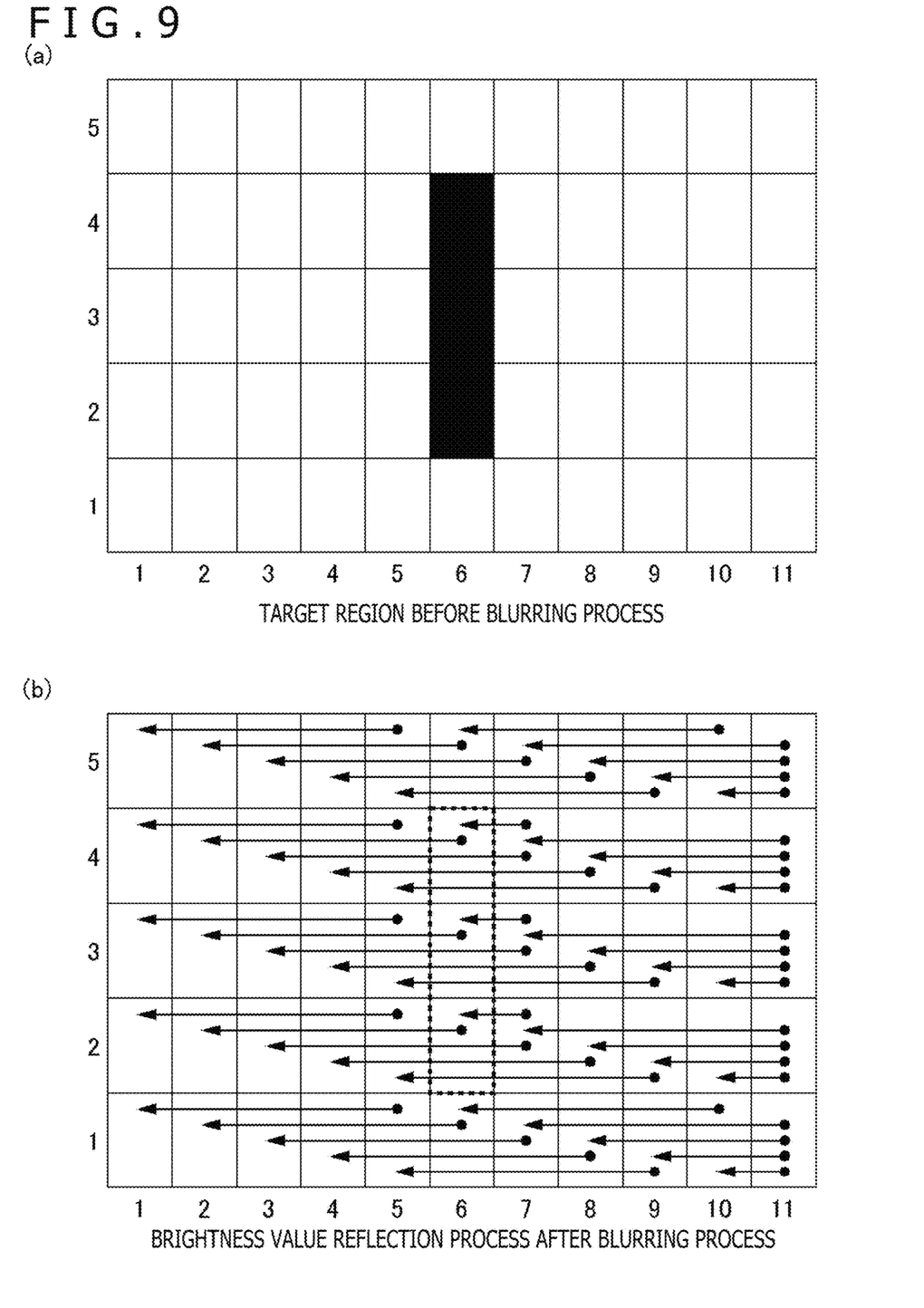
FIG. 9 depict diagrams illustrating image processing performed by the second image processing section.

FIG. 9(a) illustrates an example of the target region that has not yet been blurring-processed by the first image processing section 132. When the horizontal axis is defined as the X-axis, the vertical axis is defined as the Y-axis, and pixel coordinates are defined as (x, y), pixels (6, 2), (6, 3), and (6, 4) in the target region of the original image have the same low brightness value, and the other pixels have the same high brightness value. The first image processing section 132 performs the blurring process on the target region to generate a blurred image.

FIG. 9(b) is a diagram illustrating a process that is performed by the second image processing section 134 to set each pixel in the blurred image to the brightness value of a pixel positioned to the right of each pixel. The second image processing section 134 derives a distance based on the brightness value of each pixel that has not yet been blurring-processed, and sets each pixel to the brightness value of a pixel that is positioned apart in a rightward direction from each pixel by the derived distance. The derived distance is hereinafter referred to as the "substitute distance."

In the example depicted in FIG. 9(b), the brightness values of the pixels (6, 2), (6, 3), and (6, 4) are low before the blurring process, and the substitute distance of these pixel values that is derived by the second image processing section 134 is equivalent to one pixel. Therefore, the brightness values of the pixels (6, 2), (6, 3), and (6, 4) are updated by the brightness values of right adjacent pixels (5, 2), (5, 3), and (5, 4).

Meanwhile, the brightness values of the pixels other than the pixels (6, 2), (6, 3), and (6, 4) are high before the blurring process, and the substitute distance of these pixel values that is derived by the second image processing section 134 is equivalent to four pixels. Therefore, the brightness values of the pixels other than the pixels (6, 2), (6, 3), and (6, 4) are updated by the brightness values of pixels that are positioned apart in the rightward direction by four pixels. It should be noted that the target region depicted in FIG. 9(b) does not have a pixel positioned apart in the rightward direction from the right end side pixels by four pixels (more specifically, pixels having an x-coordinate of 9 to 11). Therefore, these pixels may be set to the brightness value of pixels having an x-coordinate of 11.

Since the above-described image processing is performed by the second image processing section 134, the contours of the objects included in the target region that has not yet been blurring-processed are displayed in the target region that has been blurring-processed. Particularly, the contours indicated by a significant brightness difference in the original image are likely to appear faintly in the resulting image due to the image processing performed by the second image processing section 134.

Figure 10:
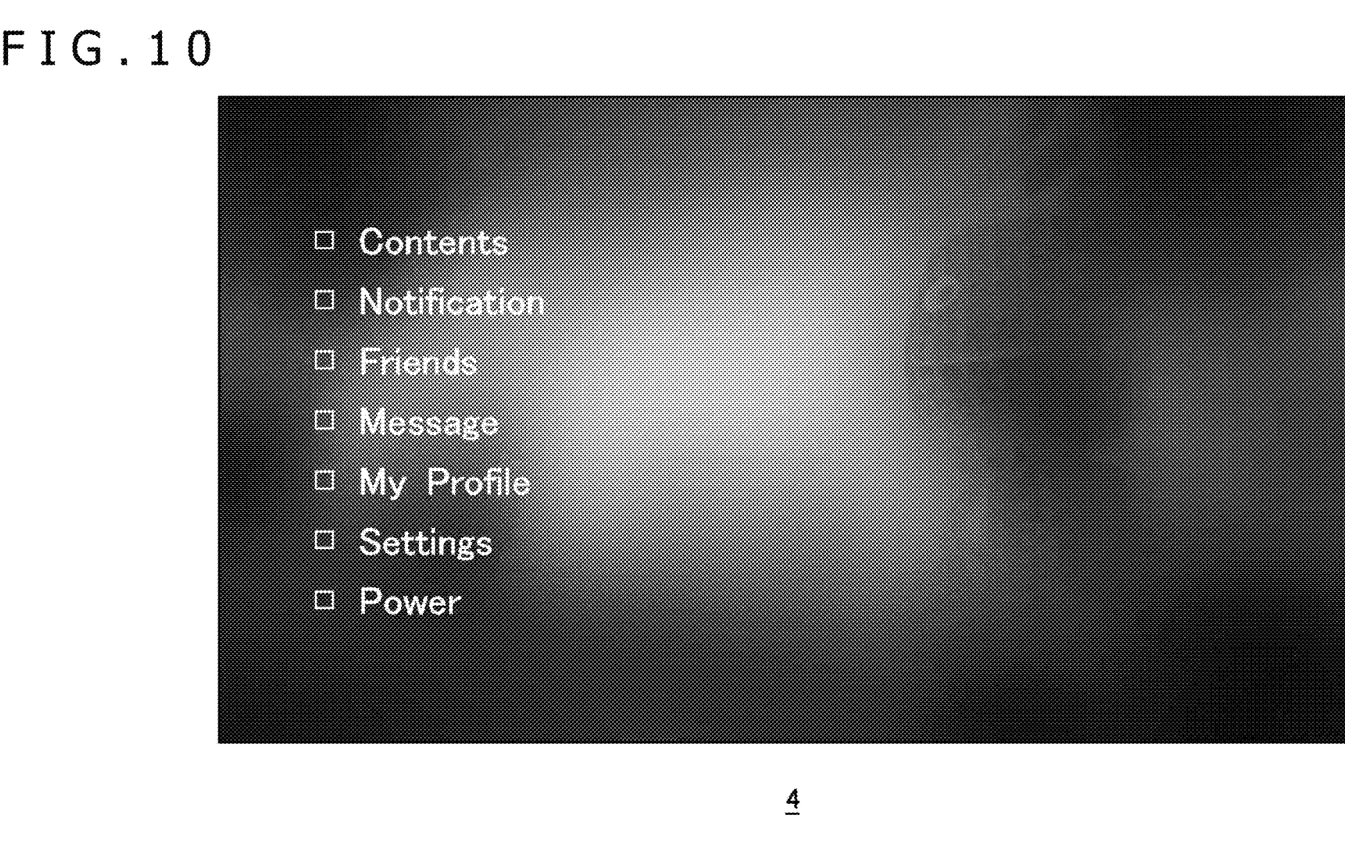
FIG. 10 is a diagram illustrating an example in which text is displayed over an image that is obtained by performing image processing on a blurred image.

FIG. 10 illustrates an example in which text indicating the menu items is displayed over an image that is obtained by performing image processing on a blurred image. As described above, the second image processing section 134 performs predetermined image processing on the blurring-processed target region by using the brightness values of individual pixels in the target region that has not yet been blurring-processed, and the text processing section 136 displays text over the target region on which the predetermined image processing has been performed.

As indicated in FIG. 10, the contours of the objects contained in the original image are partially depicted in the image subjected to the image processing by the second image processing section 134. As mentioned earlier, when the image processing is performed on the blurred image, contour lines indicated by a significant brightness difference in the original image faintly appear. When the contour lines of the objects are made to appear in the blurred image as described above, unity and continuity with the original image are successfully maintained, maintaining the visibility of text.

The present invention has been described above in terms of an embodiment. The embodiment is illustrative. Persons of skill in the art will appreciate that the combination of the component elements and processes according to the embodiment may variously be modified and that such modifications are also within the scope of the present invention.

INDUSTRIAL APPLICABILITY

The present invention is applicable to a technical field where text is displayed over an image.

REFERENCE SIGNS LIST

1: Information processing system
100: Processing section
102: Communication section
110: Reception section
120: Content execution section
122: Content image generation section
124: Content sound generation section
130: System image generation section
132: First image processing section
134: Second image processing section
136: Text processing section
140: Display control section
150: Frame buffer

The invention claimed is:

1. An image processing apparatus comprising:
a first image processing section that performs a blurring process on a target region that is at least a part of a content image;
a second image processing section that performs predetermined image processing on the blurring-processed target region by using brightness values of individual pixels in the target region that has not yet been blurring-processed; and
a text processing section that displays text over the target region subjected to the predetermined image processing,
wherein the second image processing section reflects brightness values of pixels in the blurring-processed target region that are positioned apart by a distance based on the brightness values of the pixels in the target region that have not yet been blurring-processed on the pixels in the target region.

2. The image processing apparatus according to claim 1, wherein the second image processing section causes some of contours of objects included in the target region that has not yet been blurring-processed to be displayed in the blurring-processed target region.

3. The image processing apparatus according to claim 1, wherein the second image processing section sets each pixel in the target region to a brightness value of a pixel in the blurring-processed target region that is positioned apart in a predetermined direction by a distance based on the brightness value of each pixel not yet blurring-processed.

4. The image processing apparatus according to claim 3, wherein the predetermined direction is a horizontal direction.

5. The image processing apparatus according to claim 1, wherein the distance to be set by the second image processing section increases with an increase in the brightness value used before the blurring process, and decreases with a decrease in the brightness value used before the blurring process.

6. An image processing method comprising:
performing a blurring process on a target region that is at least a part of a content image;
performing predetermined image processing on the blurring-processed target region by using brightness values of individual pixels in the target region that has not yet been blurring-processed; and
displaying text over the target region subjected to the predetermined image processing,
wherein the performing predetermined image processing includes reflecting brightness values of pixels in the blurring-processed target region that are positioned apart by a distance based on the brightness values of the pixels in the target region that have not yet been blurring-processed on the pixels in the target region.

7. A non-transitory, computer readable storage medium containing a computer program, which when executed by a computer, causes the computer to perform an image processing method by carrying out actions, comprising:
performing a blurring process on a target region that is at least a part of a content image;
performing predetermined image processing on the blurring-processed target region by using brightness values of individual pixels in the target region that has not yet been blurring-processed; and
displaying text over the target region subjected to the predetermined image processing,
wherein the performing predetermined image processing includes reflecting brightness values of pixels in the blurring-processed target region that are positioned apart by a distance based on the brightness values of the pixels in the target region that have not yet been blurring-processed on the pixels in the target region.

* * * * *